United States Patent
Kawakami et al.

(10) Patent No.: US 6,203,766 B1
(45) Date of Patent: Mar. 20, 2001

(54) DUMPING DEVICE OF CATALYST INSIDE REACTOR AND DUMPING METHOD USING THE SAME

(75) Inventors: Katsuhiko Kawakami; Nobuyoshi Sawamura; Shinichi Nagata, all of Tokyo (JP)

(73) Assignee: Softard Industries Co., Ltd., Tokyo (JP)

( * ) Notice: Subject to any disclaimer, the term of this patent is extended or adjusted under 35 U.S.C. 154(b) by 0 days.

(21) Appl. No.: 09/257,203

(22) Filed: Feb. 25, 1999

(30) Foreign Application Priority Data

Sep. 17, 1998 (JP) .................................................. 10-263112

(51) Int. Cl.[7] ................................ B01J 8/02; B01J 38/00; B65G 65/40
(52) U.S. Cl. .......................... 422/219; 422/211; 422/232; 285/123.1; 285/123.15; 285/179; 285/901
(58) Field of Search .................................... 422/232, 219, 422/145, 211; 285/801, 123.1, 123.15, 331, 179, 901

(56) References Cited

U.S. PATENT DOCUMENTS

| 4,721,425 | * | 1/1988 | Strocker | 414/298 |
|---|---|---|---|---|
| 5,143,875 | * | 9/1992 | Owen et al. | 422/144 |
| 5,454,913 | * | 10/1995 | Yeoman et al. | 422/191 |
| 5,988,690 | * | 11/1999 | Bogard | 285/331 |
| 5,997,049 | * | 12/1999 | Kingsford et al. | 285/331 |

* cited by examiner

Primary Examiner—Hien Tran
(74) Attorney, Agent, or Firm—Lowe Hauptman Gilman & Berner, LLP (57) ABSTRACT

A catalyst dumping device (10) for unloading a catalyst (50) inside a reactor (1), in which smashed used catalyst is thrown into a dumping pipe (11) formed of a plurality of pipe member (12) provided to the reactor (1) to unload to outside of the reactor (1) by fall by dead weight. Accordingly, the catalyst can be unloaded only by throwing the catalyst into the dumping pipe (11), thereby improving work efficiency. Furthermore, no special apparatus such as a vacuum apparatus is unnecessary, thereby reducing cost for the special apparatus.

9 Claims, 10 Drawing Sheets

DUMPING DEVICE OF CATALYST INSIDE REACTOR AND DUMPING METHOD USING THE SAME

BACKGROUND OF THE INVENTION

1. Field of the Invention

The present invention relates to a dumping device and a dumping method for unloading used catalyst adhered and agglomerated inside a reactor of petroleum refining plant, chemical plant and the like.

2. Description of Related Art

Various catalysts are used in a petroleum refining plant, chemical plant and the like for facilitating chemical reactions. The catalysts are used being filled inside a reactor for circulating fluid material.

Such catalysts have to be periodically unloaded from the reactor to be exchanged, since activity of the catalyst gets weak as the catalysts are poisoned by sedimentation of carbide, metal or the like and the catalysts are smashed on account of lowering of mechanical strength. The catalysts also need to be unloaded from the reactor for repairing or examining the plant.

[Unloading Condition of Catalyst]

The catalysts need to be unloaded in a short time period for minimizing plant shut-down time.

Further, since the catalyst in operation is often in a reducing atmosphere, carbide, sulfur etc. adhered to the catalyst while the catalyst is used can generate heat on account of oxidization of the catalyst when the catalyst is made open to the air for exchanging the catalyst. Accordingly, the unloading work has to be appropriately performed considering accompanying bad influence of the heat, and, further, dust of the catalyst on human body.

Further, nitrogen gas is supplied into the reactor for preventing ignition caused by oxidization of the catalyst when the reactor is big, so that the work is conducted under nitrogen gas atmosphere.

[Actual Catalyst Unloading]

Conventionally, following methods are known for unloading the catalyst from the reactor.

(1) Unloading the catalyst from catalyst dumping nozzle provided on a lower part of the reactor.

(2) Vacuum unloading the catalyst from a manhole provided onto a top part of the reactor.

Which one of the above methods should be selected is determined by a supervisor after opening the catalyst dumping nozzle of the reactor to examine whether the inside catalyst can be unloaded or not. When the catalyst is not agglomerated and can be unloaded from the catalyst dumping nozzle, the unloading work is conducted according to above (1) method.

On the other hand, when the catalyst is agglomerated and can not be unloaded from the catalyst dumping nozzle, the unloading work is performed according to above (2) method. In other words, after discharging reacting material such as crude oil before the vacuum unloading, the agglomerated catalyst is smashed using a spade etc., or alternatively, a pick etc. driven by air or oil pressure when the catalyst is especially agglomerate. Subsequently, the smashed and powdered catalyst is sucked in by a vacuum hose and the like from the manhole side to discharge to a hopper etc.

[Problem in Unloading Catalyst]

Though the catalyst in the reactor is agglomerated, the carbide and the like adhered to the catalyst can be oxidized to generate heat when the catalyst is made open to the air. In this case, the unloading work is difficult on account of a high temperature of the reactor. Further, when the work is carried out in the nitrogen gas atmosphere, the unloading work is difficult to be performed in the reactor. Accordingly, long time is necessary for the unloading work of the catalyst inside the reactor, so that the work efficiency is deteriorated and the plant shut-down time is prolonged.

Further, according to the conventional vacuum unloading method, the catalyst dumping nozzle is opened to examine whether the catalyst can be discharged therefrom. Consequently, when the catalyst can not be discharged from the catalyst dumping nozzle, the unloading process has to be changed to perform the vacuum unloading using the vacuum hose from the upper manhole. Accordingly, the work efficiency is bad for the extra process. Further, since the catalyst is sucked in by the vacuum hose while smashing the catalyst, the catalyst has to be smashed considerably small and the vacuum hose has to be drawn to the smashed spot. Therefore, a plurality of workers are necessary, thereby further deteriorating work efficiency.

According to the conventional vacuum unloading method, a special vacuum apparatus is necessary, thereby requiring extra costs.

Since the catalyst is sucked at an intense speed according to the conventional vacuum unloading method, the catalyst is often smashed to cause almost 20% catalyst loss, thereby causing bad yield rate for recycling the catalyst.

SUMMARY OF THE INVENTION

The object of the present invention is to provide a dumping device and a dumping method for unloading catalyst inside a reactor which can improve work efficiency, do not require a special apparatus such as a vacuum apparatus and can prevent the catalyst from being smashed to decrease loss of the catalyst.

For the object, the smashed catalyst is unloaded by dropping the used catalyst inside the reactor by virtue of gravity according to the present invention.

A catalyst dumping device according to the present invention is for unloading used catalyst from an inside of a reactor. The catalyst dumping device has a catalyst dumping-out member extending perpendicularly inside the reactor and further extending from an inside to an outside of the reactor, the catalyst dumping-out member having a falling passage of the used catalyst smashed thereinside, and an upper end of the catalyst dumping-out member is located adjacent to an uppermost surface of the catalyst.

In the above arrangement, the catalyst dumping-out member is preferably a pipe member having inner diameter large enough for a block of catalyst of a certain size, not only minutely smashed catalyst, to pass through. A single member is possible, however, it is preferable that the catalyst dumping-out member can be divided into a predetermined length for convenience of installing and handling.

The catalyst dumping-out member is preferably made of anticorrosive stainless steel. However, the catalyst dumping-out member may be made of an ordinary steel anticorrosively processed. Alternatively, the catalyst dumping-out member may be made of ceramics, earthenware pipe or concrete. Paper can also be used for convenience of disposal. Further, heat-resistant synthetic resin pipe having flexibility may be used considering facilitation of installment and detachment.

Accordingly, the catalyst inside the reactor is thrown into the catalyst dumping-out member installed inside the reactor after being smashed and is unloaded by a fall.

Since the catalyst inside the reactor can be unloaded only by being thrown into the dumping-out member installed in the reactor, work efficiency can be improved. Since no special apparatus such as a vacuum apparatus is unnecessary, the cost can be reduced.

Since the smashed catalyst can be unloaded only by being thrown into the dumping-out member, fewer workers are necessary than the vacuum method requiring workers for smashing the catalyst and the workers for sucking the smashed catalyst by a vacuum apparatus. Accordingly, when there is the same number of workers as in the vacuum method, approximately twice as much as work, simply calculated, can be done by the workers smashing and throwing the catalyst, thereby also improving the work efficiency in this respect.

Since the catalyst is thrown into the dumping-out member being smashed at a certain size to be fallen and unloaded, the catalyst can be prevented from being broken into pieces, so that the catalyst loss can be decreased.

The catalyst dumping-out member preferably includes a plurality of pipe members connected with each other.

Accordingly, the catalyst dumping-out member can be constructed using a plurality of pipe member. Since each pipe member can be handled easily, the catalyst dumping-out member can be easily installed and removed.

The pipe members are preferably connected by fitting an insert provided to a lower bulge of a pipe member to a fitting portion provided to an upper bulge of a pairing pipe member. The insert preferably includes an inner ring portion formed successively to an inner diameter of the pipe member, an outer ring portion consecutive to an outer diameter and a groove portion formed between the ring portions. And the fitting portion preferably includes first abutting portion formed to the lower bulge of the pairing pipe member capable of being abutted to an upper side of the inner ring portion, a protrusion protruding downward from the first abutting portion and second abutting portion capable of being abutted to an upper side of the outer ring portion.

The inner ring portion and the outer ring portion of the fitting portion may be located coplanarly, or on different planes. A gap may preferably formed between a distal end of the protrusion of the pairing pipe member and a bottom of the groove portion of the pipe member for gasket etc. to be packed therein.

According to the above arrangement, the pipe members are connected by fitting the insert of the pairing pipe member to the fitting portion of the pipe member, so that the connecting portion is nested and sealability inside the pipe members can be ensured. Therefore, process fluid for the catalyst such as crude oil can be prevented from flowing into the pipe members. Consequently, the process fluid and the catalyst can work as designed for performing sufficient function of the catalyst.

The connecting portion of the respective pipe members is preferably provided with a sealing member for preventing process fluid for catalyst from flowing into an inside of the pipe members from outside by virtue of a pressure difference between the inside and outside of the pipe members.

The sealing member is, for instance, packing or gasket, which is preferably accommodated in a gap between the protrusion of the connecting portion of the pipe members and the groove portion.

Accordingly, the pressure difference between the inside and the outside of the pipe members can be decreased by virtue of the sealing member provided to the respective connecting portion of the pipe members. Therefore, process fluid for the catalyst can be prevented from flowing into the inside of the pipe members from the outside. Consequently, the process fluid and the catalyst can work as designed for performing sufficient function of the catalyst.

A high-density member having larger density than the catalyst is preferably filled inside the respective pipe members for preventing process fluid for catalyst from flowing into an inside of the pipe members from an outside by virtue of a pressure difference between the inside and the outside of the pipe members.

Any material can be used for the high-density member as long as it has larger density than the catalyst, such as sand or ceramic sand.

Accordingly, the pressure difference between the inside and the outside of the pipe members can be decreased by virtue of the high-density member filled inside the respective pipe members. Therefore, process fluid for the catalyst can be prevented from flowing into the inside of the pipe members from the outside. Consequently, the process fluid and the catalyst can work as designed for performing sufficient function of the catalyst.

The respective pipe members are preferably provided with a lifting member for suspending and lifting the respective pipe members.

Any arrangement can be adopted for the lifting member, for example, in which a nut-shaped member is attached to the pipe member and a stick member is engaged thereto for hanging and lifting by a wire etc., or a ring-shaped member is movably attached to the pipe member for hanging and lifting by a hook attached to a wire etc.

According to the above arrangement, the respective pipe members can be hanged and lifted by the lifting member, thereby facilitating attachment and detachment of the pipe members.

A nozzle is preferably provided approximately at an extended position of the catalyst dumping-out member for the catalyst dumping-out member to pass through.

Accordingly, when the catalyst dumping-out member is detached, the catalyst dumping-out member can be taken out from the nozzle provided approximately at the extended position of the catalyst dumping-out member without moving the catalyst dumping-out member in a transverse direction inside the reactor, thereby facilitating the detachment work of the catalyst dumping-out member.

A catalyst dumping method according to the present invention is for unloading used catalyst from an inside of a reactor. The catalyst dumping method is characterized in having the steps of: providing a catalyst dumping-out member inside the reactor extending perpendicularly inside the reactor and further extending from the inside of the reactor to an outside of the reactor, the catalyst dumping-out member having a plurality of pipe members connected with each other provided thereinside with falling passage for a smashed catalyst; smashing the catalyst; throwing the smashed catalyst into an uppermost pipe member; while continuing the smashing and throwing steps, detaching the connected pipe members sequentially from an upper pipe member in accordance with lowering of a level of an upper surface of the catalyst; and continuing to throw the smashed catalyst into the pipe member of corresponding level of the upper surface of the catalyst, thereby unloading the catalyst inside the reactor.

According to the above arrangement, the catalyst inside the reactor is thrown into the catalyst dumping-out member installed inside the reactor after being smashed and is unloaded by a fall. Since the catalyst inside the reactor can be unloaded only by being thrown into the dumping-out member installed in the reactor, work efficiency can be improved. Since no special apparatus such as a vacuum apparatus is unnecessary, the cost can be reduced.

Since the smashed catalyst can be unloaded only by being thrown into the catalyst dumping-out member, fewer workers are necessary than the vacuum method requiring workers for smashing the catalyst and the workers for sucking the smashed catalyst by a vacuum apparatus. Accordingly, when there is the same number of workers as in the vacuum method, approximately twice as much as work, simply calculated, can be done by the workers smashing and throwing the catalyst, thereby also improving the work efficiency in this respect.

Since the catalyst is thrown into the dumping-out member being smashed at a certain size to be fallen and unloaded, the catalyst can be prevented from being breaking into pieces, so that the catalyst loss can be decreased.

DETAILED DESCRIPTION OF PREFERRED EMBODIMENT(S)

First embodiment of the present invention is shown in FIGS. 1 to 8.

Figure 1:
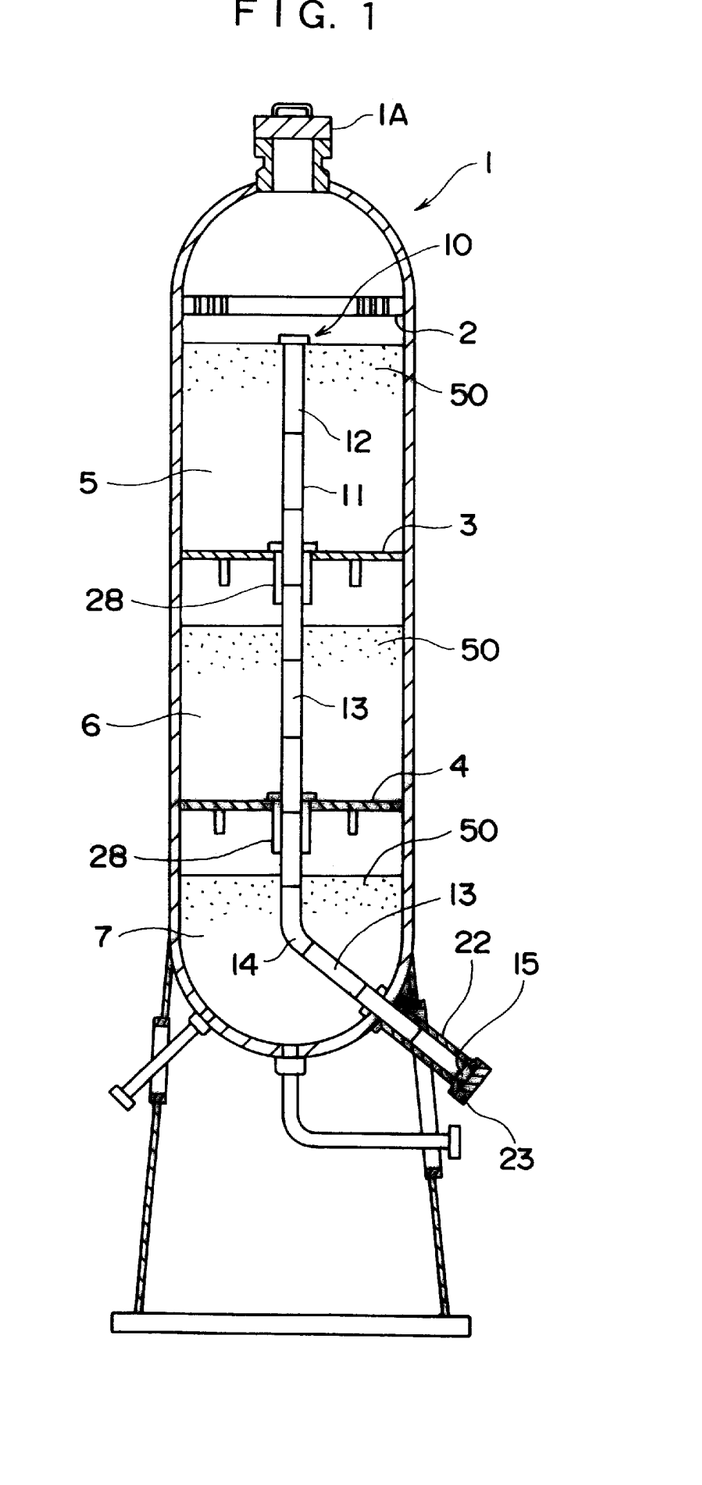
FIG. 1 is an entire view of a reactor provided with a dumping device of catalyst inside the reactor according to first embodiment of the present invention.

A dumping device 10 is provided to a reactor 1 in which a plurality of sorts of material is reacted at a predetermined temperature and pressure condition.

The reactor 1 has a three-bed structure composed of an upper bed 5, a middle bed 6 and a lower bed 7, each partitioned by first internals 2, second internals 3 and third internals 4. A catalyst 50 is filled in the middle bed 6 and the lower bed 7.

A manhole 1A is provided on an upper portion of the reactor 1 and a catalyst dumping nozzle 22 is provided on a lower portion of the reactor 1. When the catalyst is unloaded from the reactor 1 and when the catalyst is agglomerated inside the reactor 1, oil or a chemical agent is injected from the manhole 1A to form a film onto the catalyst for preventing oxidization of the catalyst. And a pressure introducing hose is put into the reactor 1 when an air pick is used for smashing the agglomerated catalyst.

The dumping device 10 has a dumping pipe 11 as a catalyst dumping-out member having a falling passage of the smashed catalyst thereinside.

The dumping pipe 11 is placed perpendicularly substantially at a center of diameter of the reactor 1, an upper end of the dumping pipe 11 being located adjacent to an uppermost side of the catalyst 50 filled in the upper bed 5 and being bent perpendicularly downward, and a lower end of the dumping pipe 11 being bent by approximately 45 degrees to protrude toward outside of the reactor 1.

The dumping pipe 11 has a plurality of pipe members 12 to 14 and a pipe-receiving member 15 sequentially connected with each other.

More specifically, the dumping pipe 11 has an upper pipe member 12 provided on the uppermost side, a connecting pipe member 14 for connecting the bent portion, an intermediate pipe member 13 connecting the pipe members 12 and 14, the pipe-receiving member 15 provided to the lower end of the dumping pipe 11 and the intermediate pipe member 13 connecting the pipe members 14 and 15. Respective pipe members 12 to 14 and the pipe-receiving members 15 is made of, for instance, stainless steel and have a length of about 1 to 2 m, for instance.

Figure 2:
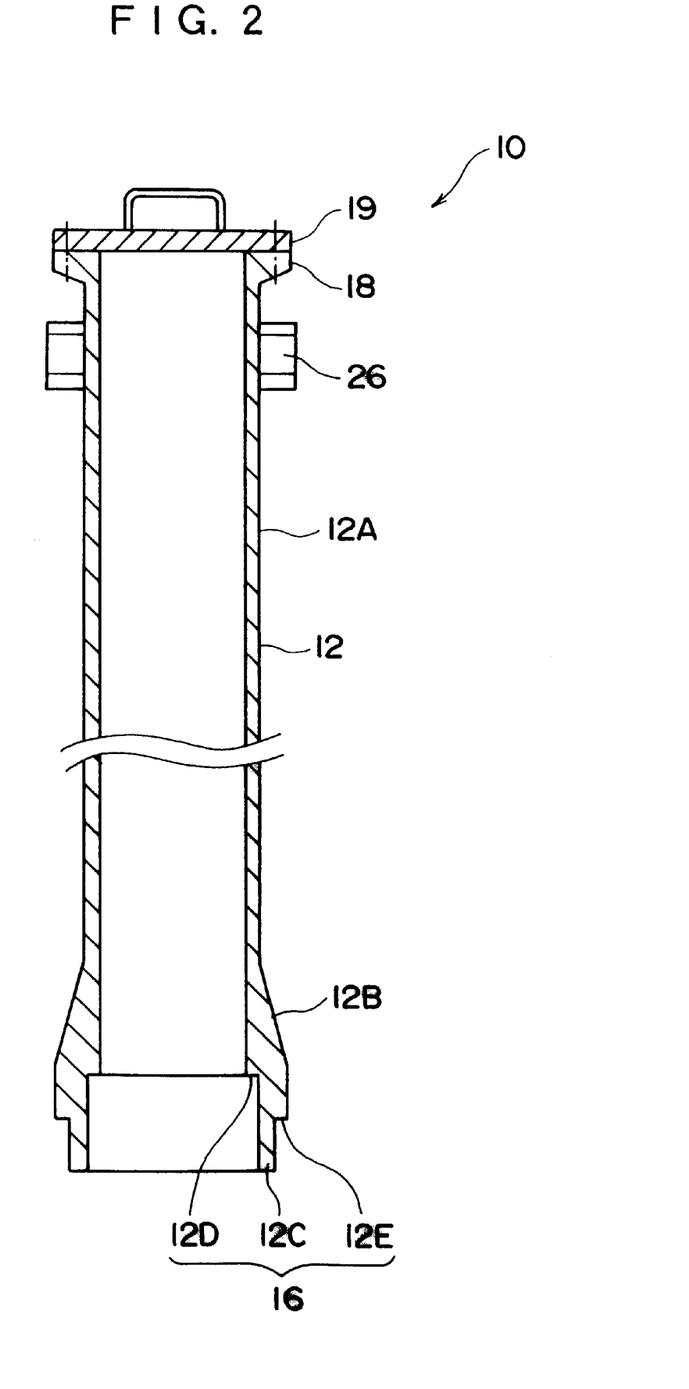
FIG. 2 is a longitudinal section showing an upper pipe member constituting the dumping device of catalyst inside the reactor according to the first embodiment of the present invention.

As shown in FIG. 2, a lower flange 18 provided to an outer circumference of an upper end of a pipe body 12A of the upper pipe member 12 and an upper flange 19 for easily attachably engaging to the lower flange 18 are provided to an upper end of the upper pipe member 12. A lower end of the pipe body 12A of the pipe member 12 has a conic bulge 12B having outer diameter partly enlarging toward downward direction and a ring-shaped protrusion 12C having approximately one third of thickness of the bulge 12B provided below the bulge 12B.

A step portion 12D as first abutting portion is formed inside the protrusion 12C successively to an inner diameter of the pipe member 12, and an outer step portion 12E as second abutting portion is formed on an outer side of the protrusion 12C having a middle height position between the distal end of the protrusion 12C and the step portion 12D.

The protrusion 12C, the step portion 12D and the outer step portion 12E constitute an insert 16.

A lifting lug 26 as a lifting member is provided to three to four positions of outer circumference of an upper portion of the pipe body 12A of the upper pipe member 12.

A female screw is carved horizontally inside the lifting lug 26 so that a male screw portion such as a hook may be screwed to suspend the upper pipe member 12 by hanging a wire or the like to the hook or the like.

Figure 3:
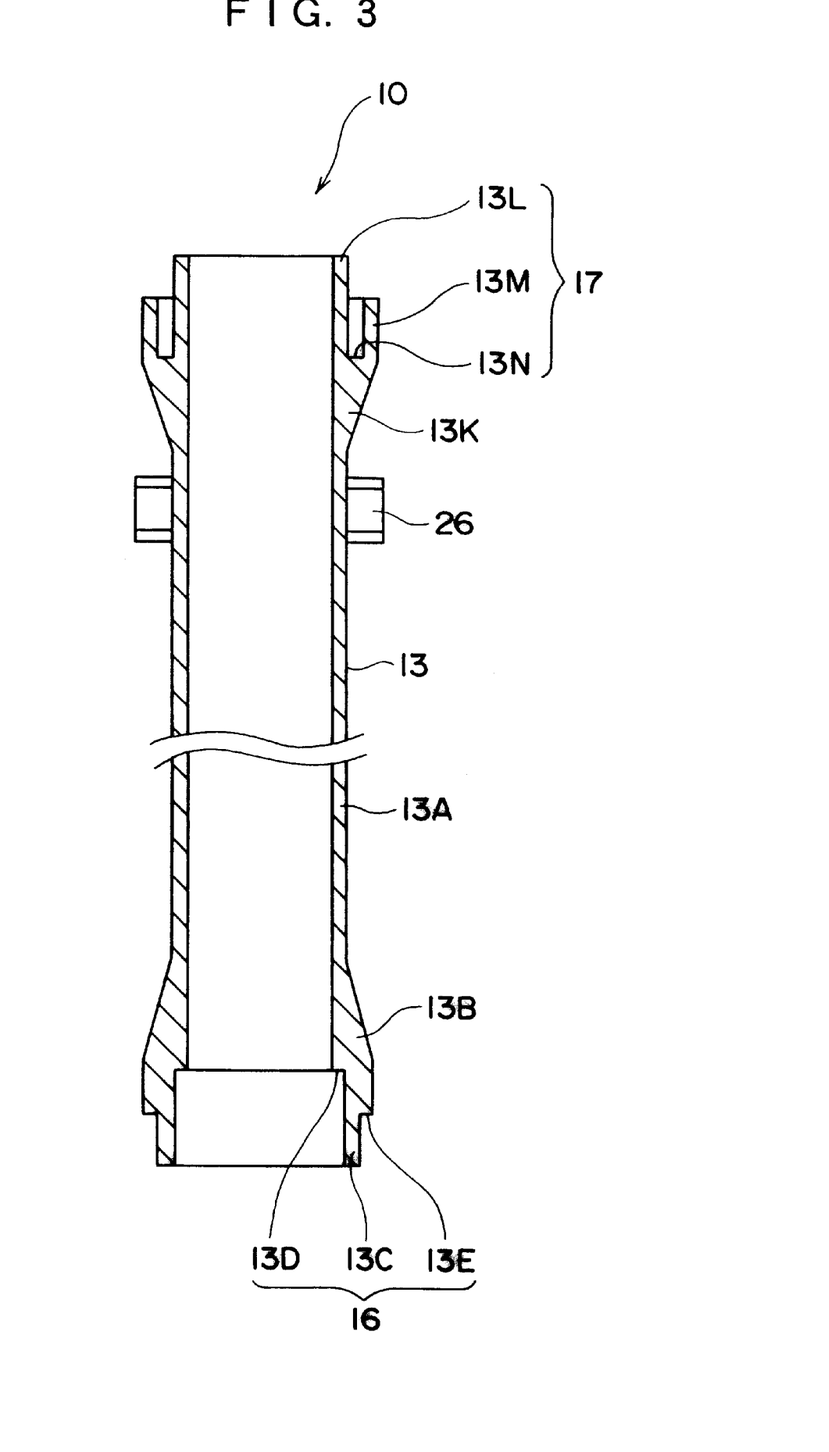
FIG. 3 is a longitudinal section showing an intermediate pipe member constituting the dumping device of catalyst inside the reactor according to the first embodiment of the present invention.

As shown in FIG. 3, the intermediate pipe member 13 has a bulge 13K and 13B with a shape similar to the bulge 12B on an upper and lower end of a pipe body 13A. The lower bulge 13B has a protrusion 13C, a step portion 13D and an outer step portion 13E having identical configuration with the protrusion 12C, the step portion 12D and the outer step portion 12E of the pipe member 12. The protrusion 13C, the step portion 13D and the outer step portion 13E constitute an insert 16.

The upper bulge 13K has an inner ring portion 13L to be abutted to the step portion 13D of the bulge 13B, an outer ring portion 13M to be abutted to the outer step portion 13E and a groove portion 13N formed between the inner ring portion 13L and the outer ring portion 13M.

The inner ring portion 13L, the outer ring portion 13M and the groove portion 13N constitute a fitting portion 17.

The lifting lug 26 is also provided to an upper portion of the pipe body 13A.

Figure 4:
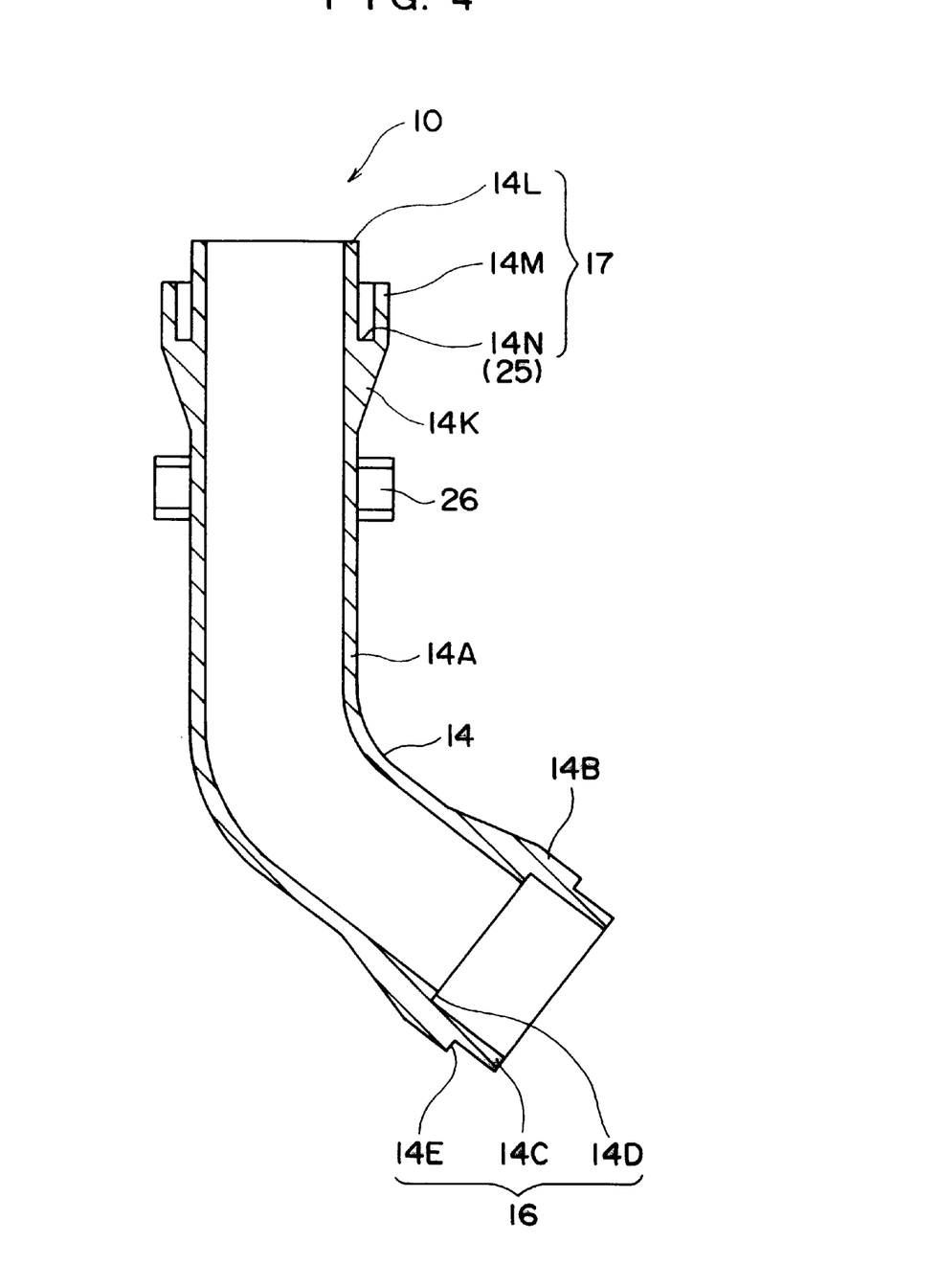
FIG. 4 is a longitudinal section showing a connecting pipe member constituting the dumping device of catalyst inside the reactor according to the first embodiment of the present invention.

As shown in FIG. 4, the connecting pipe member 14 has a pipe body 14A formed in an elbow-shape, a bulge 14B and 14K on both ends of the pipe body 14A. The bulge 14B has a protrusion 14C, a step portion 14D and an outer step portion 14E having identical configuration with respective components of the pipe member 13. The bulge 14K has an inner ring portion 14L, an outer ring portion 14M and a groove portion 14N having identical configuration with respective components of the pipe member 13.

The lifting lug 26 is also provided to an upper portion of the pipe body 14A.

Figure 5:
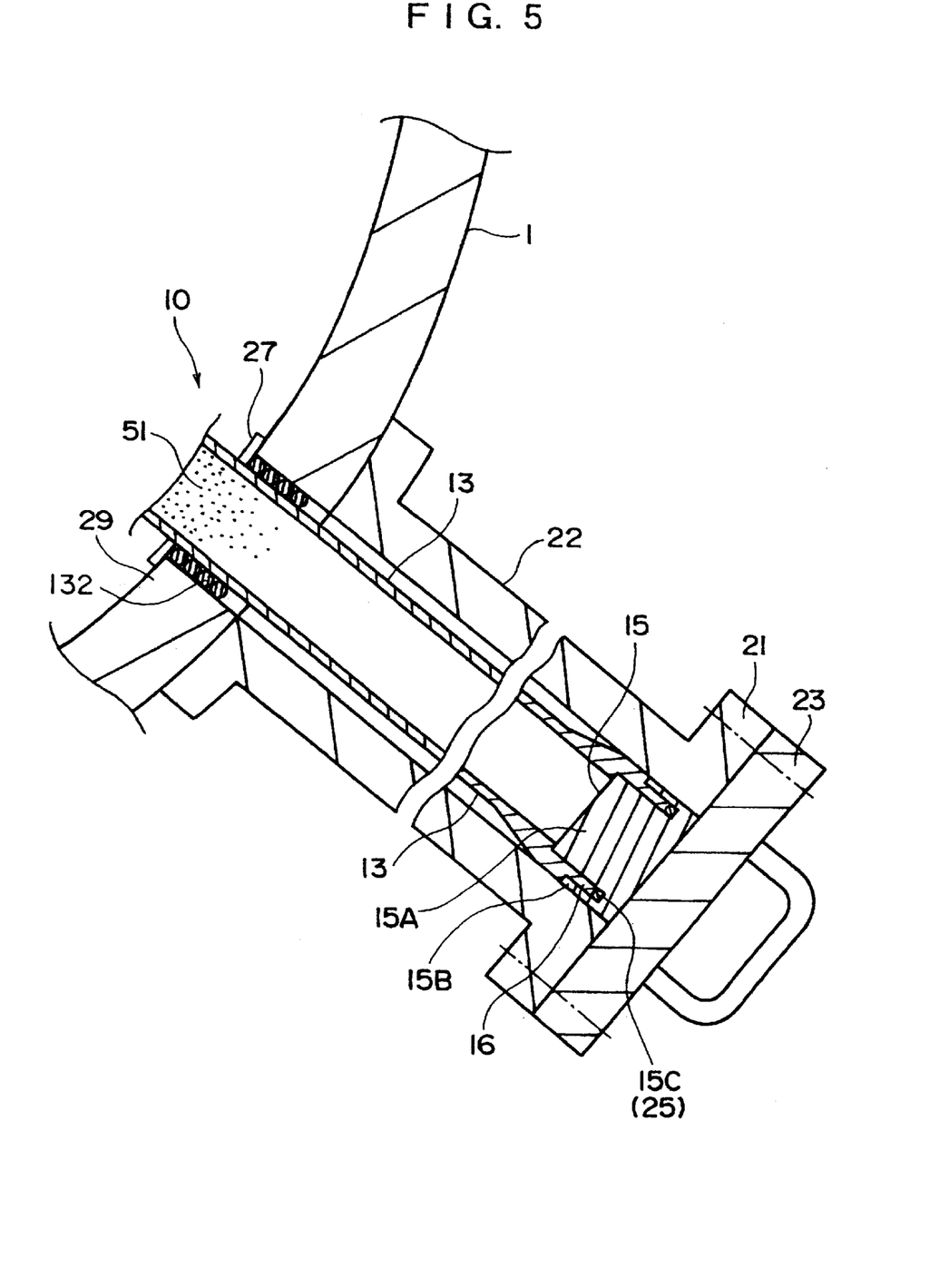
FIG. 5 is a longitudinal section showing a pipe-receiving member constituting the dumping device of catalyst inside the reactor according to the first embodiment of the present invention.

As shown in FIG. 5, the pipe-receiving member 15 is formed of a cylindrical stick or the like, and has a body 15A for engaging an inner diameter of the intermediate pipe member 13 located to a lowermost end, an outer ring portion 15B provided to an axial end and outside of the body 15A to engage to the outer step portion 13E of the intermediate pipe member 13 and a groove portion 15C between the body 15A and the outer ring portion 15B. The pipe-receiving member 15 is attached to an upper flange 23. The upper flange 23 is detachably attached to a lower flange 21 attached to the catalyst dumping nozzle 22 mounted to the reactor 1. A stopper 27 is attached to the pipe member 13 inside the reactor 1 at a halfway thereof corresponding to a gate portion 29 to the nozzle 22 for engaging to the gate portion 29. A gasket 132 is packed around the outer circumference of the pipe member 13 at the gate portion 29.

Figure 7:
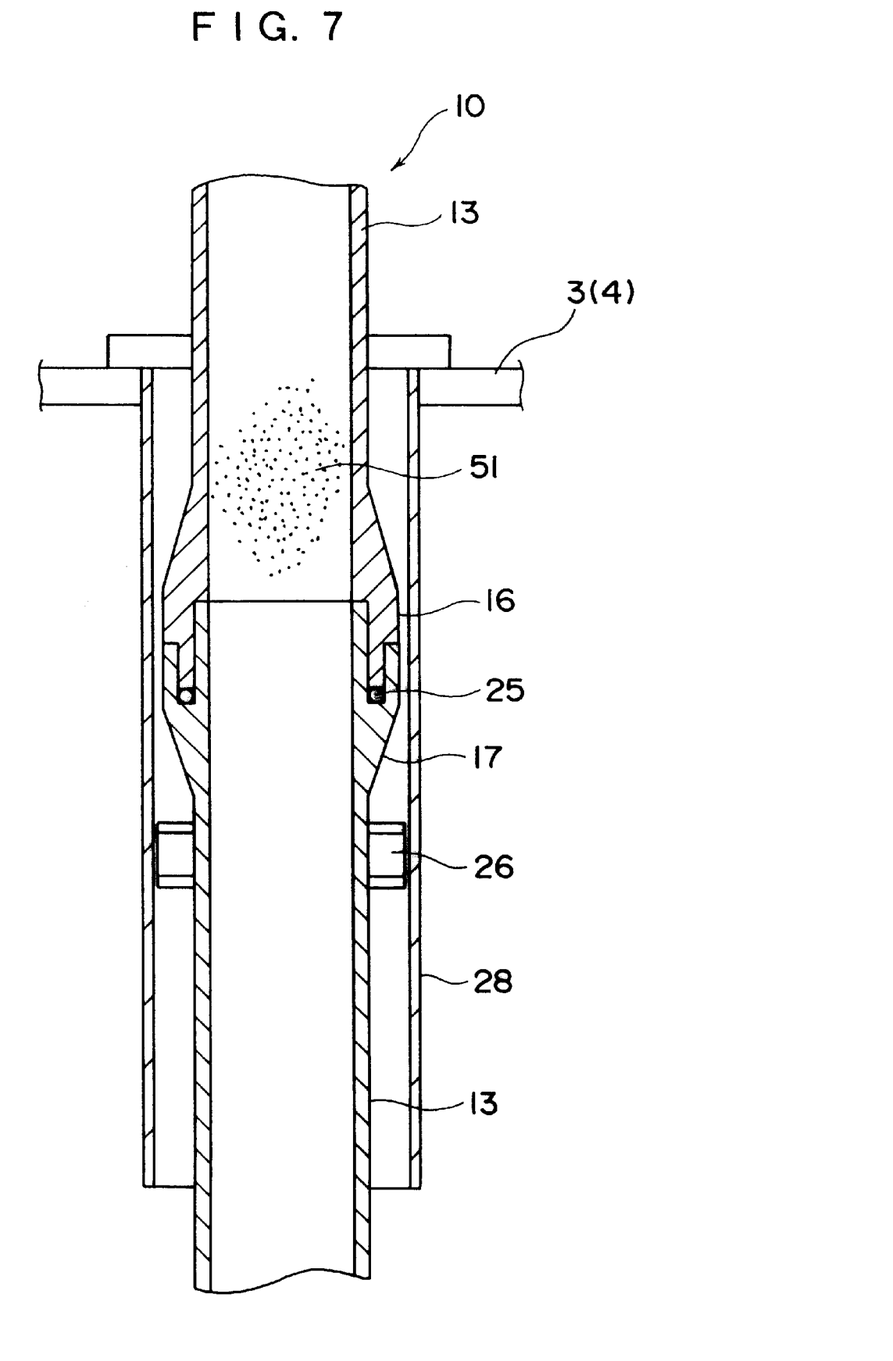
FIG. 7 is a longitudinal section showing an outer cylinder constituting the dumping device of catalyst inside the reactor according to the first embodiment of the present invention.

As shown in FIG. 7, an outer cylinder 28 is provided to and supported by the second internals 3 and the third internals 4.

The outer cylinder 28 is not requisite. However, the upper pipe member 12 and/or the intermediate pipe member 13 can be inserted through the outer cylinder 28, so that the outer cylinder 28 can work as a cover for preventing the intermediate pipe member 13 and the like from falling down.

Figure 6:
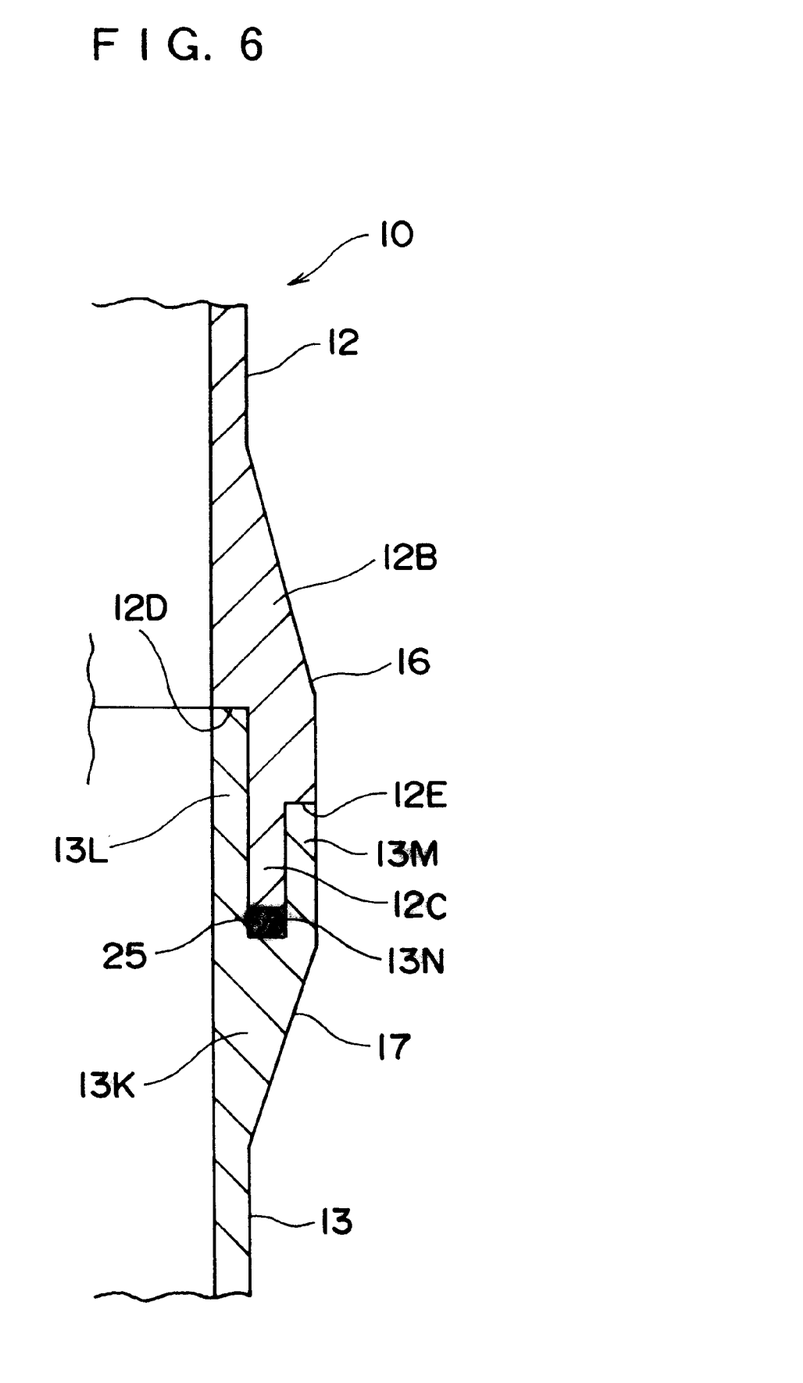
FIG. 6 is a partial longitudinal section showing a connecting condition between the pipe members constituting the dumping device of catalyst inside the reactor according to the first embodiment of the present invention.

As shown in FIG. 6, the respective pipe members constituting the dumping pipe 11 are connected with each other by inserting the insert 16 to the fitting portion 17 in installing the reactor 1.

More specifically, when the pipe members 12 and 13 are connected, the protrusion 12C of the lower bulge 12B of the upper pipe member 12 is inserted to the groove portion 13N of the intermediate pipe member 13. At this time, the step portion 12D of the upper pipe member 12 and an upper end of the inner ring portion 13L of the intermediate pipe member 13 are abutted. Additionally, the outer step portion 12E of the upper pipe member 12 and an upper end of the outer ring portion 13M of the intermediate pipe member 13 are abutted in a manner that a slight gap are formed between the protrusion 12C of the upper pipe member 12 and a bottom of the groove portion 13N of the intermediate pipe member 13. The gasket 25 is packed into the gap as a sealing member. Incidentally, the respective pipe members are connected identically in all of the pipe members, so that the description is represented by the connection of the upper pipe member 12 and the intermediate pipe member 13.

The step portion 12D, the protrusion 12C and the outer step portion 12E are located at different height positions respectively and the pipe members 12 and 13 are connected in a nesting manner. Furthermore, the gasket 25 is packed in the nesting connecting portion. Accordingly, great sealingness of the pipe member 12 and the like, i.e. of the dumping pipe 11 can be obtained. Therefore, a pressure difference between the outside and the inside of the dumping pipe 11 is lessened, thereby preventing a process fluid (fluid material such as crude oil) from entering (bypassing) into the inside of the dumping pipe 11.

Figure 8:
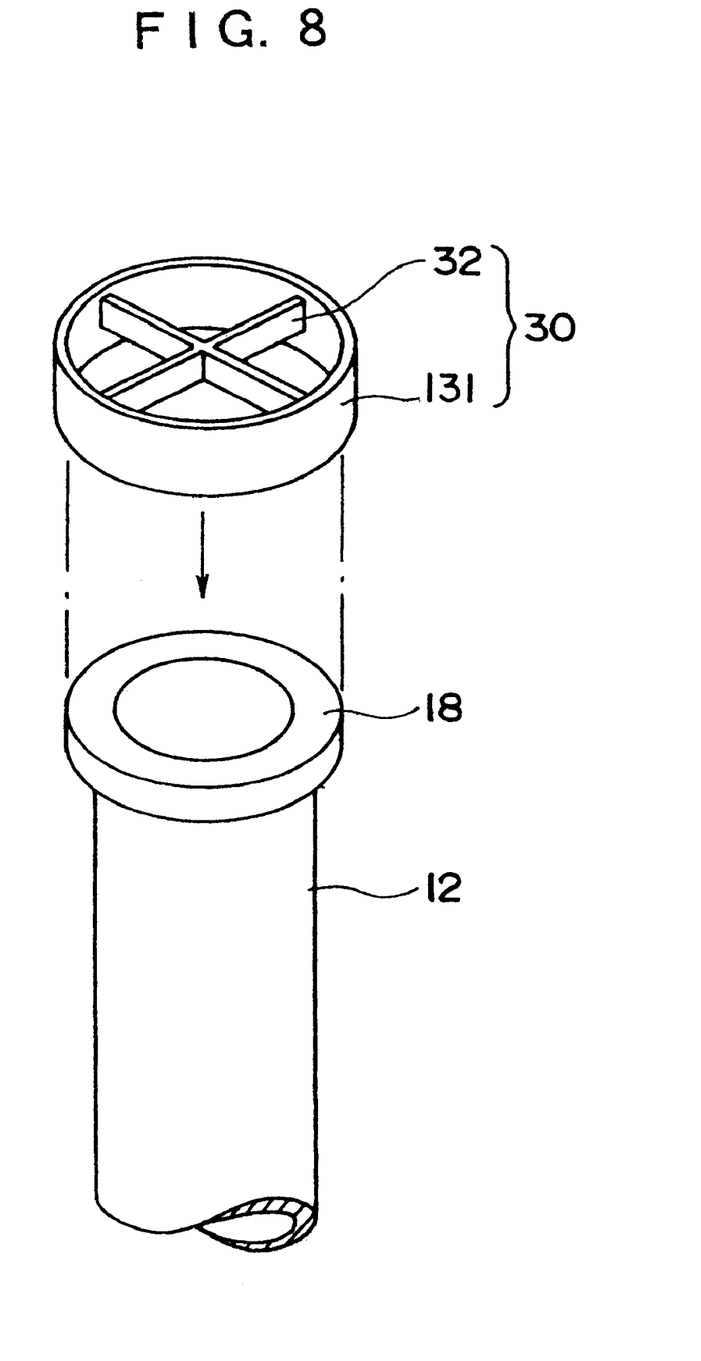
FIG. 8 is a perspective view showing the pipe member covered with a sieve constituting the dumping device of catalyst inside the reactor according to the first embodiment of the present invention.

As shown in FIG. 8, a sieve 30 is detachably attached to the upper end of the upper pipe member 12. The sieve 30 has a main body 131 made of a pipe having a diameter large enough to cover the lower flange 18, and a partition 32 attached to an inner circumference of the main body 131 planarly crosswise. Though not shown, such sieve 30 can be put on the upper end of the respective intermediate pipe member 13 and an upper end of the outer cylinder 28.

According to the above arrangement, only a block of catalyst smaller than one fourth of the sieve area as partitioned by the partition 32 can pass through the upper pipe member 12. Reversely speaking, the block of catalyst passing through the sieve 30 can be fallen and unloaded through the dumping pipe 11 including the upper pipe member 12 without being trapped inside the dumping pipe 11.

After installing the dumping pipe 11 by connecting respective pipe members 12 to 14 and the pipe-receiving member 15, a high-density member 51 such as sand and ceramic sand having larger density than the catalyst is thrown into and filled inside the dumping pipe 11 by opening the upper flange 19 on the upper pipe member 12 as shown in FIG. 2.

The catalyst inside the reactor 1 is unloaded in accordance with following steps using the above-described dumping pipe 11. The steps form a dumping method of the catalyst inside the reactor 1 according to the present invention.

First, the dumping pipe 11 is constructed by connecting the respective pipe member 12 to 14 and the pipe-receiving member 15 and packing the gasket 25 to the respective connecting portions in the reactor 1. Subsequently, the upper flange 19 of the upper pipe member 12 is opened and the sand or the ceramic sand is thrown into the dumping pipe 11 and the upper flange 19 is shut.

After filling the catalyst 50 in the reactor 1 and conducting predetermined operation, the catalyst is unloaded for the sake of exchanging the catalyst or the like. In starting the unloading work, workers enter the reactor 1 to confirm that the catalyst's condition is suitable for the unloading work (e.g. the temperature of the catalyst is below 50 degrees). Then the workers smash the block of the catalyst inside the reactor 1 by a spade or an air pick. At this time, the upper flange 23 of the catalyst dumping nozzle 22 is opened to unload the sand or the ceramic sand 51 inside the dumping pipe 11 and the upper flange 19 of the upper pipe member 12 is detached. And the sieve 30 is put onto the upper pipe member 12.

Subsequently, the smashed catalyst in the upper bed 5 is thrown into the dumping pipe 11 through the sieve 30. When the catalyst in the upper bed 5 is unloaded by continuing the unloading work to reach a position adjacent to the upper end of the intermediate pipe member 13 connected to the upper pipe member 12, the upper pipe member 12 is lifted and detached from the intermediate pipe member 13 by hanging a wire to the lifting lug 26 to take out from the manhole 1A.

The catalyst unloading process is carried out by repeating the above-described work while sequentially detaching the intermediate pipe member 13 having a predetermined height and throwing the smashed catalyst in the middle bed 6 and the lower bed 7 into the dumping pipe 1 through the sieve 30.

After completion of the unloading process, the dumping pipe is assembled to an initial state by a process reverse to the above, i.e. attaching the upper flange 23 of the catalyst dumping nozzle 22, and connecting the intermediate pipe member 13, the pipe member 14, the other intermediate pipe member 13 and the upper pipe member 12 from the bottom. Subsequently, the catalyst is filled in and the operation is restarted.

According to the present embodiment, following effect can be obtained.

(1) The catalyst inside the reactor 1 can be unloaded only by being thrown into the dumping pipe 11 installed in the reactor 1 after smashing by the air pick or the like, thereby improving work efficiency.

(2) Since the catalyst inside the reactor 1 can be unloaded only by being thrown into the dumping pipe 11, no special apparatus such as a vacuum apparatus is unnecessary and the cost can be reduced.

(3) Since the smashed catalyst can be unloaded only by being thrown into the dumping pipe 11, fewer workers are necessary than the vacuum method requiring workers for smashing the catalyst and for sucking the smashed catalyst by a vacuum apparatus. Accordingly, when there is the same number of workers as in the vacuum method, approximately twice as much as work, simply calculated, can be done by the workers smashing and throwing the catalyst, thereby improving the work efficiency in this respect.

(4) Since the catalyst is thrown into the dumping pipe 11 being smashed at a certain size to be fallen and unloaded, the catalyst can be prevented from being breaking into pieces, so that the catalyst loss can be decreased to improve a yield rate for recycling.

(5) Since the dumping pipe 11 is constituted of a connection of the upper pipe member 12, a plurality of the intermediate pipe member 13, the connecting pipe member 14 and the pipe-receiving member 15 being configured to a size easy for handling, the connection and detachment can be assembled easily.

(6) According to the present embodiment, the pipe members are detached in accordance with the level of the upper surface of the catalyst so that the catalyst can be thrown into the pipe members even when the level of the catalyst is lowered. Therefore, there is no need for the workers to toss up the catalyst, thereby decreasing fatigue of the workers to enhance work efficiency.

(7) The connection formed of the insert 16 of respective pipe members of the dumping pipe 11 and the fitting portion 17 are nested. Furthermore, the connection has the gasket 25 packed thereinside and the sand or the ceramic sand 51 is filled inside the dumping pipe 11. Accordingly, the pressure difference between the inside and outside of the dumping pipe 11 can be reduced to prevent the fluid material such as crude oil from being flown into the dumping pipe 11 from the outside of the dumping pipe 11, i.e. the catalyst side, thereby preventing bypassing.

(8) Since the sieve 30 put onto the respective pipe members 12 and the like are partitioned crosswise by the partition 32, only blocks of catalyst smaller than one forth of the area of the respective pipe members 12 etc. can pass through the upper pipe member 12. Reversely speaking, the catalyst passing through the sieve 30 can fall through the dumping pipe 11 without being choked inside the dumping pipe 11, thereby improving the efficiency of the unloading work.

Figure 9:
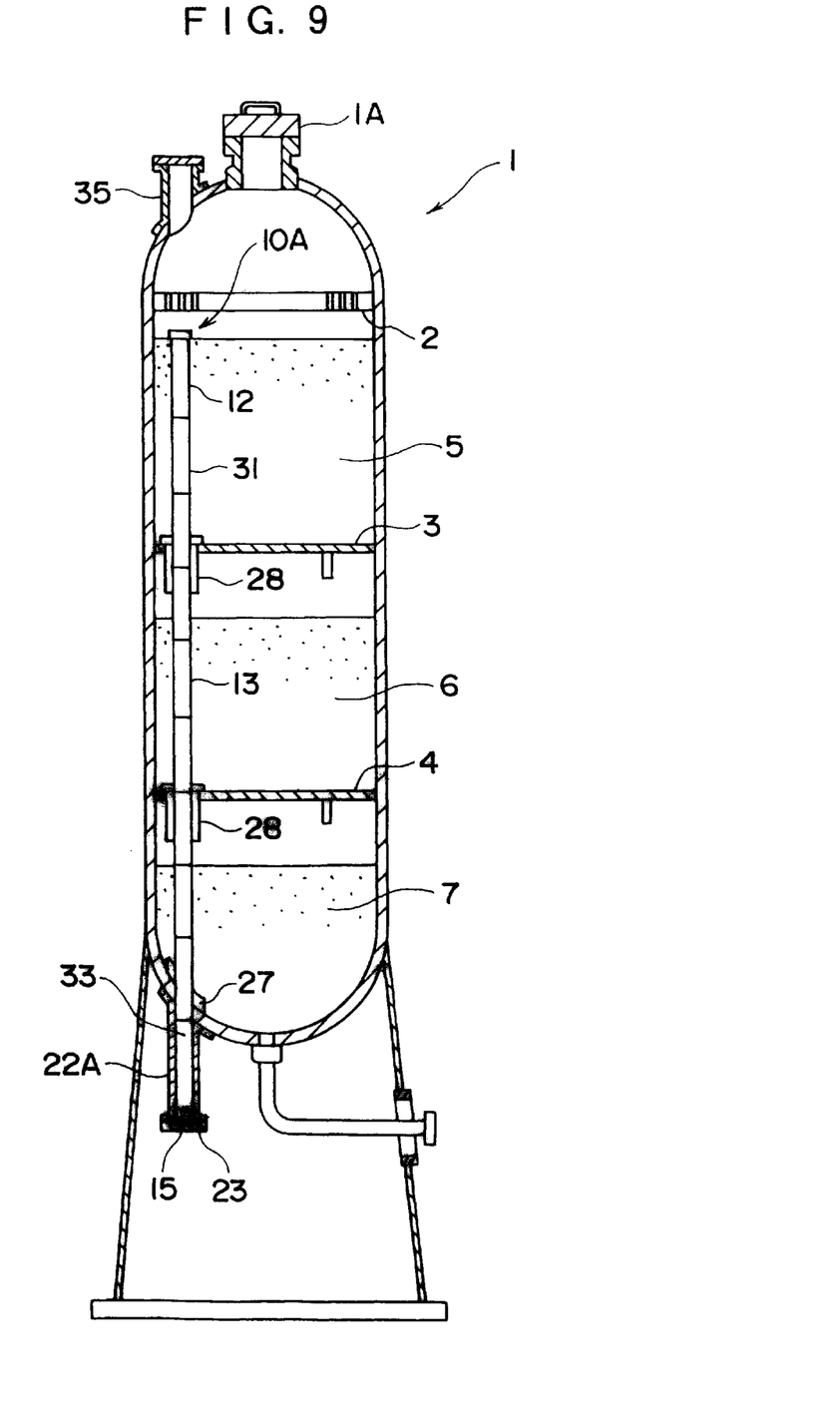
FIG. 9 is an entire view of a reactor provided with a dumping device of catalyst inside a reactor according to second embodiment of the present invention.

Second embodiment of the present invention will be described below with reference to FIGS. 9 and 10.

The dumping device 10A according to the second embodiment has a dumping pipe 31 perpendicularly placed eccentrically to the center of the reactor 1 in contrast to the dumping pipe 11 of the first embodiment located perpendicularly at the center of the reactor 1. A pipe member 33 provided to the lower end of the dumping pipe 31 is inserted to a catalyst dumping nozzle 22A attached perpendicularly outside the reactor 1.

According to the present embodiment, only a pipe member connected to the pipe-receiving member 15 is different from the pipe members of the first embodiment and the other construction is the same. Accordingly, only different part will be described below and the same reference numeral will be applied to the same members for omitting or simplifying the description.

Figure 10:
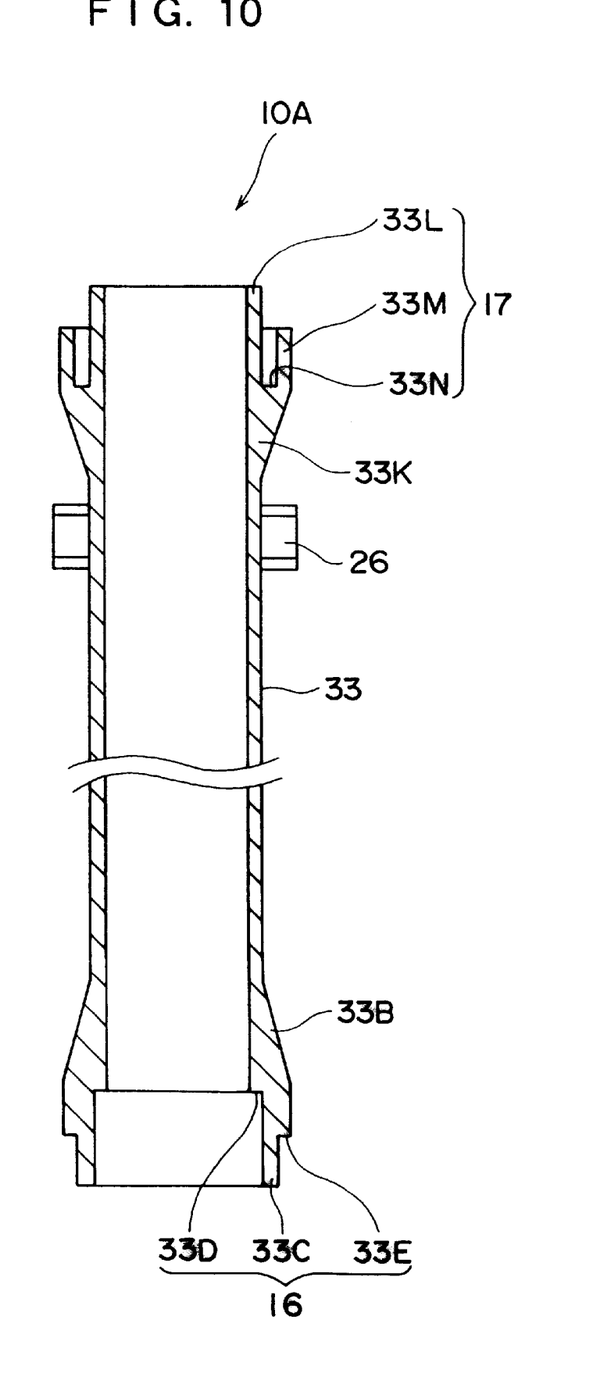
FIG. 10 is a longitudinal section showing a lower pipe member constituting the dumping device of catalyst inside the reactor according to the second embodiment of the present invention.

As shown in FIG. 10, the lower pipe member 33 connected to the pipe-receiving member 15 has substantially the same configuration as the intermediate pipe member 13 of the first embodiment, which has a fitting portion 17 including an upper bulge 33K, an inner ring portion 33L, an outer ring portion 33M and a groove portion 33N, and an insert 16 including a lower bulge 33B, a protrusion 33C, a step portion 33D and an outer step portion 33E.

A nozzle 35 is provided on an upper portion of the reactor 1 approximately corresponding to an extended position of the dumping pipe 31. When the nozzle 35 has larger inner diameter than the outer diameter of the dumping pipe 31, the dumping pipe 31 can be taken out from the nozzle 35. However, when the nozzle 35 is smaller than the dumping pipe 31, the dumping pipe 31 can be taken out from a manhole 1A and the nozzle 35 may be shifted.

According to the second embodiment, effects and advantages similar to the first embodiment can be obtained.

The scope of the present invention is not limited to the above-described embodiments but includes modifications as long as the object of the present invention can be attained.

According to the above-described embodiments, the level of the step portion 12D, 13D etc. of the insert 16 of the respective pipe members 12, 13 etc. and the outer step portion 12E, 13E etc. are located at the same height level. However, the step portions and the outer step portions may be located at the same level, or alternatively, the outer step portions may be located higher than the step portions. In this case, the height of the step portions 12D, 13D etc. may be made corresponding to the level of the inner and outer ring members 13L and 13M.

The high-density member 51 such as the sand and the ceramic sand are filled inside the dumping pipe 11 according to the above-described embodiment. However, the high-density member is not requisite and may not be filled in. However, when the high-density member 51 is filled, the sealability inside the dumping pipe 11 can be ensured to securely prevent bypassing.

According to the above-described embodiments, the reactor 1 has a three-bed structure composed of the upper bed 5, the middle bed 6 and the lower bed 7. However, the dumping device 10 of the catalyst inside the reactor according to the present invention may be applied to any reactors having multi-stage structure with more than a single stage.

Further, it is preferable that paper sheet is attached onto the outer surface of the dumping pipe 11 for preventing the catalyst from sticking. The attached paper sheet is carbonized during the operation of the reactor being retained within heated atmosphere of 250 to 300° C. Accordingly, the carbonized sheet works as a peeler and antifriction member for preventing the used catalyst from sticking to the dumping pipe 11, thereby unloading the catalyst smoothly.

Ordinary paper of plant fiber material can be used for the paper sheet. Alternatively, synthetic paper can also be preferably used so long as necessary carbonization can be obtained. The paper sheet can be attached to the outer surface of the dumping pipe 11 by any means, such as pasting adhesive on the back thereof and fastening with pins.

What is claimed is:

1. A catalyst dumping device for unloading used catalyst from an inside of a reactor, comprising:

a catalyst dumping-out member extending substantially axially inside the reactor and further extending from the inside to an outside of the reactor, the catalyst dumping-out member including a plurality of pipe members consecutively connected with each other to form an opening and a discharge passage to unload the used catalyst, wherein the plurality of pipe members are structured to be detachable during the unloading operation to adjust a level of an opening of the catalyst dumping-out member adjacent to a level of the used catalyst.

2. The catalyst dumping device according to claim 1, wherein the plurality of pipe members are connected by fitting an insert portion formed at a first end of a pipe member to a fitting portion formed at a second end of a successive pipe member, thereby allowing the plurality of pipe members to be easily detachable during the unloading operation.

3. The catalyst dumping device according to claim 2, wherein the fitting portion includes an inner ring portion formed successively to an inner diameter of the pipe member, and an outer ring portion spaced from the inner ring portion by a groove portion;

and wherein the insert portion includes a first abutting portion adapted to be abutted to the inner ring portion, a second abutting portion adapted to be abutted to the outer ring portion, and a protrusion protruding axially from the first and the second abutting portions and adapted to be received within the groove portion.

4. The catalyst dumping device according to claim 2, wherein the insert portion is provided to a lower bulge of at least a pipe member.

5. The catalyst dumping device according to claim 2, wherein the fitting portion is provided to an upper bulge of at least a pipe member.

6. The catalyst dumping device according to claim 1, further including at least a sealing member inserted between the consecutively connected pipe members for preventing a process fluid for catalyst from flowing into the discharge passage by virtue of a pressure difference between an inside and an outside of the pipe members.

7. The catalyst dumping device according to claim 1, wherein a high-density member having a larger density than the catalyst is filled inside the pipe members for preventing a process fluid for catalyst from flowing into the discharge passage by virtue of a pressure difference between an inside and an outside of the pipe members.

8. The catalyst dumping device according to claim 1, wherein each of the plurality of pipe members includes a lifting member for suspending and lifting the pipe member.

9. The catalyst dumping device according to claim 1, wherein a nozzle is provided approximately at an extended position of the catalyst dumping-out member for the catalyst dumping-out member to pass through.

* * * * *